United States Patent [19]

Wright, Jr.

[11] Patent Number: 5,509,228
[45] Date of Patent: Apr. 23, 1996

[54] ERGONOMICALLY DESIGNED HANDLE AND CONTOURED GRIPPING PORTION

[76] Inventor: Philip N. Wright, Jr., 1011 River Dr., No. 101, Livingston, Mont. 50047

[21] Appl. No.: 219,509

[22] Filed: Mar. 29, 1994

[51] Int. Cl.$^6$ ..................................................... A01K 87/08
[52] U.S. Cl. ................................................................. 43/23
[58] Field of Search ............................. 43/23; 16/110 R, 16/111 R; 7/167; D22/142

[56] References Cited

U.S. PATENT DOCUMENTS

| | | | |
|---|---|---|---|
| D. 299,514 | 1/1989 | Andreasen | D22/142 |
| D. 300,056 | 2/1989 | Andreasen | D22/142 |
| D. 300,167 | 3/1989 | Andreasen et al. | D22/142 |
| D. 300,168 | 3/1989 | Andreasen | D22/142 |
| 828,557 | 8/1906 | Levison | 43/23 |
| 1,931,303 | 10/1933 | Sturgis | 43/23 |
| 4,038,719 | 8/1977 | Bennett | 16/110 |
| 4,418,732 | 12/1983 | Kolonia | 16/111 R |
| 4,577,432 | 3/1986 | Brackett et al. | 43/23 |
| 4,631,853 | 12/1986 | Brackett et al. | 43/23 |
| 4,697,376 | 10/1987 | Brackett et al. | 43/18.1 |
| 4,850,130 | 7/1989 | Childre et al. | 43/23 |
| 5,125,130 | 6/1992 | Stanish | 16/110 |

FOREIGN PATENT DOCUMENTS

WO94/03052  2/1994  WIPO ...................................... 43/18.1

Primary Examiner—P. Austin Bradley
Assistant Examiner—Jeanne Elpel
Attorney, Agent, or Firm—Shoshana R. Davids; Skadden, Arps, Slate, Meagher & Flom

[57] ABSTRACT

A handle for an implement or sports equipment such as a fishing rod, having a contoured gripping portion designed so as to reduce fatigue and tension while improving casting accuracy without interfering with reel function. The handle and contoured gripping portion are adapted to being surroundingly mounted on an elongated shaft member of said implement or sports equipment. The gripping portion is contoured so as to correspond to the natural angles and position of the hand and palm, with an S-shaped curvature on its top side, and a triple curvature along its opposing bottom side that creates a depression in which the fingers rest when a user grasps the gripping portion of the handle. The contoured gripping portion of the handle is preferably oval shaped and slightly tapered toward both its proximal and distal ends.

9 Claims, 3 Drawing Sheets

5,509,228

ERGONOMICALLY DESIGNED HANDLE AND CONTOURED GRIPPING PORTION

FIELD OF INVENTION

The present invention relates to handles and more particularly to the gripping portion thereof. The primary benefits of such gripping portions are most readily apparent in the context of fly fishing rods. Nevertheless, it would be clear to a person of ordinary skill in the art that such handles and gripping portions can be adapted for beneficial use on a wide range of implements and sporting equipment, including knives and hammers.

BACKGROUND OF THE PRESENT INVENTION

During the last two decades, designers of tools and sporting equipment have turned their attention to the health, safety and efficiency consequences of implement handle design. Conventional handles have a straight configuration, aligned along the longitudinal axis of the implement's shaft. The classic fly fishing rod handle is a round, cigar-shaped handle affixed in such a straight configuration relative to the fly fishing rod. The negative effects of the conventional handle are particularly visible in the fly fishing context, which involves hours of repetitive fly casting motions.

In U.S. Pat. No. 4,038,719, Bennett explains the deleterious effects of a handle in a straight configuration. Rather than being adapted to the form and function of the human arm, wrist and hand, such a handle wastes muscle energy and creates physical stressors by requiring the person to adapt to the handle. Thus, when picking up an implement with a straight configuration handle, a person naturally cocks the wrist to a tension-producing angle. Furthermore, use of such a handle to generate the intended action of the implement requires unnatural wrist rotation throughout the range of motion. The handle is therefore fatiguing, wasteful of energy, and causes unnecessary localized joint stress which can wear away at the protective soft tissue and lead to debilitating injuries such as carpal tunnel syndrome. The handle, by requiring that the wrist bend repeatedly while the implement is in use, interferes with the wrist's natural shock absorption capabilities and can restrict blood flow to the fingers.

Several prior art references have described products claiming the ergonomic benefits of handles angled to overcome the problems associated with the straight configuration. U.S. Pat. No. 4,038,719, Bennett, describes a handle which is disposed at a preferred angle of 19-degrees to the longitudinal axis of the shaft, bending the handle rather than the wrist. This angle takes advantage of the natural angle of wrist flexion and extension in tasks such as hammering or sweeping. The handle is also oval in shape with a slight taper, in an attempt to conform to the hand's natural grip configuration.

The handle described by Bennett does not accommodate the knuckle position of the bent fingers. However, it is known in the art to modify the Bennett configuration by adding a second angle conforming to the contour of the knuckles so as to accommodate the knuckles and thereby alleviate friction between the knuckles and the shaft.

The Bennett handle has been adapted for use on a fishing rod. An earlier version of the present invention also included an approximately 19-degree angle such as found in the Bennett handle. However, the large angular disposition of the handle relative to the longitudinal axis of the fly fishing rod resulting from the use of such handle designs were found to interfere with the fly fishing rod's function when using the fly rod in a normal manner.

The primary 19-degree angle provided by Bennett causes the fishing rod to cast improperly, in large part because the angle of attack in the forecast brings the rod and rod tip too far down towards the horizontal and beyond, causing a caster to "dump" the forecast so that the line goes into the water in a pile rather than extending out over the water. A caster would have to make abnormal casting motion adjustments to make effective use of a fishing rod with a Bennett handle. Furthermore, the angle on the handle causes the reel seat to protrude at an extreme angle. The resulting fly rod configuration (i) causes the normal slack line, between the caster's line hand, to catch on the rod butt of the reel seat, (ii) does not allow for the use of an extension rod butt used for landing large fish, i.e., those over five pounds, (iii) leaves insufficient area along the rod's longitudinal axis for the user to properly grip the fly rod, and (iv) does not fit into a conventional fly rod case. Additional problems arise because the Bennett handle with its extreme angle cannot be retrofitted on existing fly rods having straight elongated shafts without cutting the rod shaft, and cannot be formed from cork because the cork lacks sufficient strength to support the rod shaft once it has been cut.

U.S. Pat. No. 5,125,130, Stanish, discloses a second handle configuration utilizing a larger angular distortion of 26 to 35 degrees. This handle has a two-membered gripping portion to further reduce wrist stressors, and allows more relaxed and accurate implement utilization. However, the large angular disposition disclosed by Stanish similarly would interfere with normal fly casting technique and reel configurations.

OBJECTS AND SUMMARY OF THE PRESENT INVENTION

It is an object of this invention to provide a handle having a gripping portion adapted for use on a fly fishing rod that is ergonomically designed for the human hand, wrist and arm, and has a secure and comfortable grip that places the thumb and index finger as nearly opposite each other as possible, thus stiffening the wrist and resulting in more effective fly casting.

It is a further object of the present invention to provide a fly fishing rod handle with a gripping portion that reduces casting effort and fatigue while increasing power and accuracy.

It is yet a further object of the present invention to provide an improved fly fishing rod handle and gripping portion which does not displace the reel and fits a conventional fly rod case, and can be easily retrofit on fly fishing rods to replace conventional handles.

It is yet another object of the present invention to provide an improved fly fishing rod handle and gripping portion that can be formed from cork.

According to the present invention, the handle having an ergonomically designed contoured gripping portion, and the gripping portion itself, each have an axially extending opening adapted for mounting on a fly rod such that the elongated shaft of the fly rod extends straight through the handle and its contoured gripping portion. The gripping portion is adapted to being grasped by the user between the fingers and palm with curvatures that accommodate the natural contours of the hand, palm and fingers while in the gripping position.

The curvatures of the gripping portion are most readily explained when the gripping portion of the handle is viewed with the handle mounted onto the elongated shaft of a fly rod, as shown in FIG. 1. When gripped, the top side of the gripping portion rests against the thenar eminence. The top side includes two angular curvatures. The first angular curvature begins at the distal end (i.e., the end which, when gripped, lies closest to the user's forefinger) of the gripping portion, and curves away from the axially extending opening. The second extends from the first angular curvature and curves toward the axially extending opening, terminating at the proximal end of the gripping portion. The bottom side of the gripping portion opposes the top side. The bottom side is gripped by the fingers, and has three angular curvatures: two angling away from the axially extending opening and one intermediate curvature angling toward the opening. This configuration creates a depression intermediate the other two angular curvatures on the bottom side in which the fingers grasp the gripping portion of the handle.

In a preferred embodiment, the gripping portion is made from cork and has a substantially oval cross-section. Most known fishing rod handles are round, with varying tapers and contours depending on the maker. The round grip forces the handle into the palm, and not between the thenar eminence and hypothenar eminence, causing fatigue and weakened grip from pressure on the nerves and blood vessels in the palm. The oval shape of the subject gripping portion allows the user to grip the handle with the middle phalanxes rather than the distal phalanxes, increasing stamina.

When the user holds the gripping portion, the short axis of the oval is longitudinally coaxial with the opening and the long axis of the oval is perpendicular thereto, running vertically between the top side and the bottom side of the gripping portion. The gripping portion is tapered in the direction of both its distal and proximal ends from its center, so that the substantially oval cross-section has a smaller circumference at the proximal and distal ends of the gripping portion than at its center. Furthermore, the tapering is asymmetrical, such that the long axis of the oval is shorter at the distal end of the gripping portion than at the proximal end thereof.

In a particularly preferred embodiment of the present invention, a handle mounted on a fly fishing rod is provided with a substantially oval shaped contoured gripping portion which is between 6.5 and 8.5 inches in length, with an ideal length of 7.0 inches. The oval configuration is provided with a short axis that tapers from between 0.950 and 0.975 inches at the center of the gripping portion to between 0.825 and 0.850 inches at both ends thereof. The long axis of the oval tapers from a maximum measure of between 1.250 and 1.275 inches, with a particularly preferred measure of 1.250 inches, at a point between 2.750 and 3.0 inches from the distal end of the gripping portion, to (i) a measure of between 0.950 and 0.975 inches at the distal end of the gripping portion, and (ii) a measure of between 1.10 and 1.35 inches at the proximal end of the gripping portion. The handle and the gripping portion have axially extending openings for mounting on the elongated shaft member of the fishing rod.

The top side of the gripping portion extends between the proximal and distal ends of the gripping portion. The top side is provided with (i) a first angular curvature away from extending from the distal end having an arc with a radius of 9 to 10 inches with an ideal measure of ten inches and (ii) a second angular curvature coupled to the first angular curvature terminating at the proximal end, having an arc with a radius of 11 to 12 inches having an ideal measure of twelve inches angled toward the opening.

The bottom side of the gripping portion opposes the top side and is provided with (i) a third angled curvature away from the opening having an arc with a radius of between 4.5 and 5.5 inches, having an ideal measure of five inches (ii) a fourth angled curvature away from the opening having an arc with a radius of between nine and eleven inches, having an ideal measure of ten inches and (iii) a fifth angled curvature toward the opening, creating a depression for receiving the user's hand intermediate the third and fourth angled curvatures, having an arc of radius length between nine and ten inches, having a preferred measure of 9.5 inches. The bottom side is configured such that the third angular curvature extends from the distal gripping portion end, the fifth angular curvature extends from the third angular curvature, and the fourth angular curvature extends from the fifth angular curvature and terminates at the proximal gripping portion end.

BRIEF DESCRIPTION OF THE DRAWINGS

For a more complete understanding of the present invention, reference is made to the following Detailed Description taken in conjunction with the accompanying drawings in which.

DETAILED DESCRIPTION OF THE PREFERRED EMBODIMENTS

A handle having a contoured gripping portion in accordance with a preferred embodiment of the present invention is mounted on an elongated shaft member of a fly fishing rod, with the shaft member extending through an axially extending opening in the handle and gripping portion. The gripping portion of the handle is contoured to minimize the stress on the hand, wrist and arm of the user while maximizing strong, accurate and efficient fly casting. The person of ordinary skill in the art will recognize that while a preferred embodiment of the subject invention is described in the context of its use on a fly fishing rod, the handle and gripping portion can be readily adapted for use on a wide range of implements.

Figure 1:
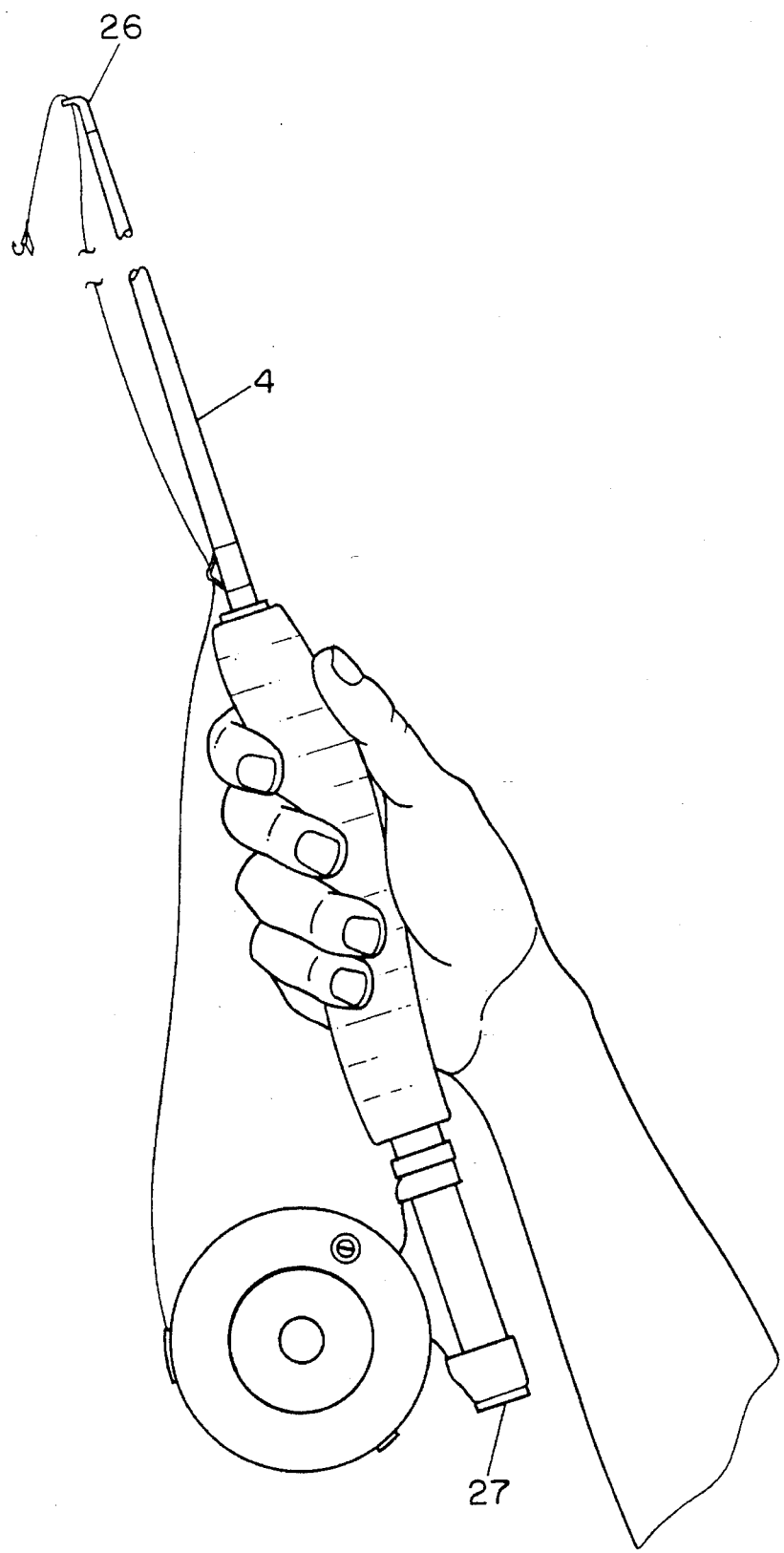
FIG. 1 shows the hand position of the user of an otherwise conventional fly fishing rod modified with the handle and contoured gripping portion of a preferred embodiment of the present invention.
Figure 3:
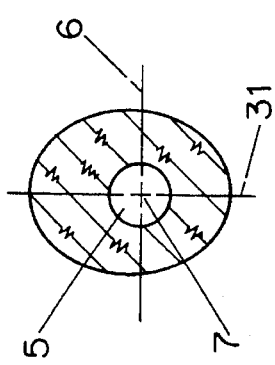
FIG. 3 is a cross sectional view of the contoured gripping portion along plane A—A of FIG. 2.

As shown in a preferred embodiment of the present invention illustrated in FIGS. 1 and 3, the gripping portion has a substantially oval shape and is tapered from its center in the direction of both of its ends, such that the circumference of the oval cross-section is smaller at the proximal and distal ends of the gripping portion than at its center. Furthermore, the tapering is symmetrical along the short axis of the cross-section and asymmetrical along the long axis thereof, such that the circumference of the distal end of the gripping portion is smaller than that of the proximal end.

Figure 2:
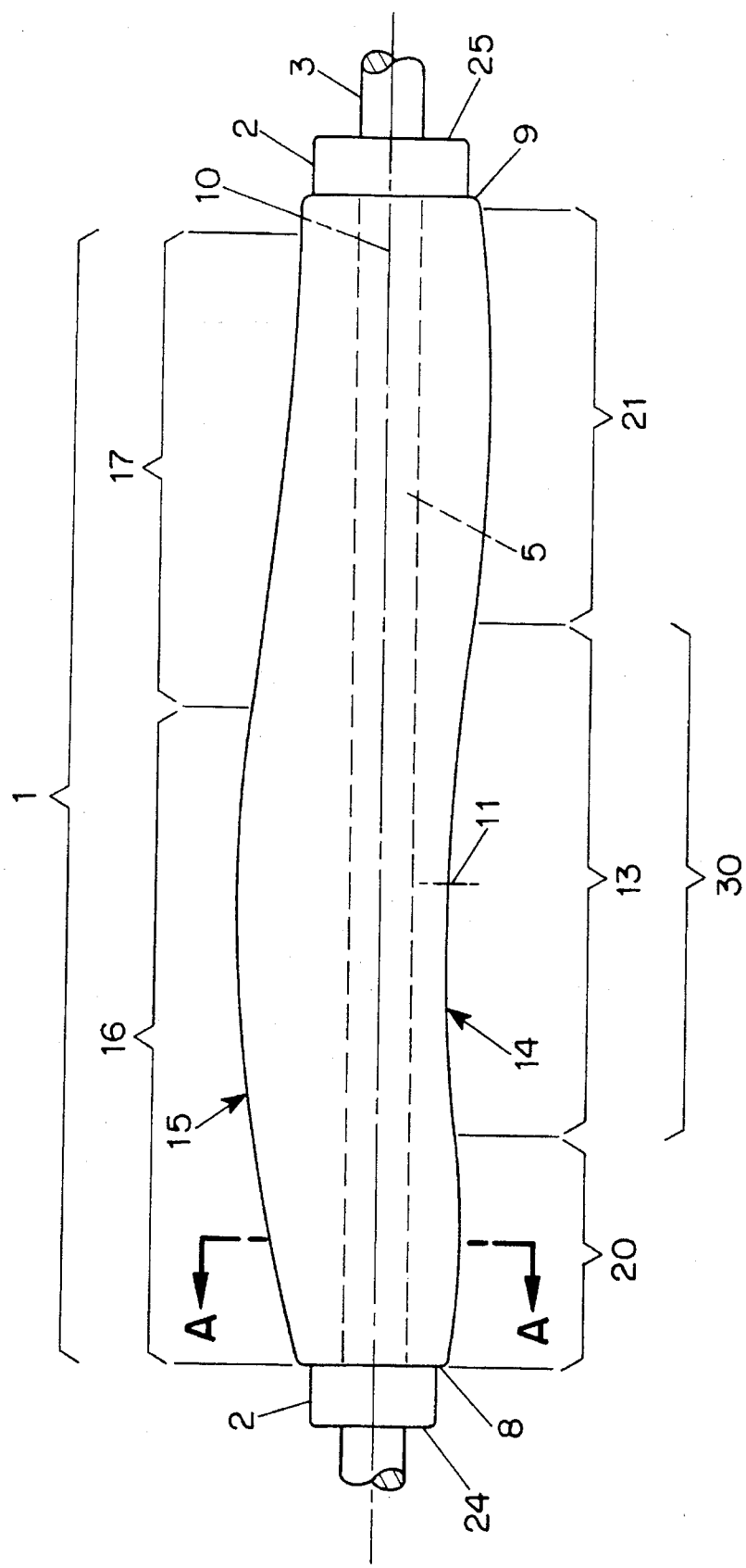
FIG. 2 is a side view of the handle and contoured gripping portion depicted in FIG. 1 showing the relationship between the contoured gripping portion, the handle and the elongated shaft of a fly fishing rod.

FIG. 2 shows a preferred embodiment of the present invention in which the gripping portion is contoured to the natural hand position of the user when the user grasps the gripping portion of handle in normal use. As displayed in FIG. 2, the top side of the gripping portion rests against the user's thenar eminence when the user grips it for use of the fly fishing rod.

The top side shown in FIG. 2 has two angular curvatures coupled in a substantially S-shaped configuration originating at the distal end thereof. The first curve is angularly disposed away from the axially extending opening, and the second curve reverses the angle so as to be angularly disposed toward the axially extending opening.

As depicted in the preferred embodiment of the present invention shown in FIG. 2, the bottom side of the contoured gripping portion opposes the top side and is gripped by the user's fingers when in normal use. The bottom side has a triple curved silhouette, including the third, fourth and fifth angular curvatures of the gripping portion. The third and fourth curvatures are angularly disposed away from the axially extending opening. The fifth angular curvature is angularly disposed toward the axially extending opening, creating a depression for receiving the user's hand.

The bottom side of the preferred embodiment seen in FIG. 2 is configured such that the angular curvatures are coupled, with the third angular curvature originating at the distal gripping portion end, the fourth angular curvature terminating at the proximal gripping portion end, and the fifth angular curvature intermediate the third and fourth.

The substantially oval shape of the gripping portion, in accordance with a preferred embodiment of the subject invention, enables a user to grasp the fly rod with the middle phalanxes of the fingers. Without the exertion of additional energy, the middle phalanx grip is significantly stronger and therefore less fatiguing than the distal phalanx grip which must be used when casting with a rod having a conventional round-shaped grip.

The contouring of the gripping portion of the present invention, as illustrated in the preferred embodiment depicted in FIG. 2, eliminates the large curves found in the prior art, and therefore does not interfere with the reel function. The user can also maintain use of a normal forecast due to the smaller angular dispositions of the present invention, rather than being forced to make the abnormal casting stroke adjustments required by the large angles of the prior art. The large angles also cause the fishing rod tips to go too far down at the finish of a normal forecast, "dumping" the cast so that the fly line piles rather than extending fully in a straight line.

The nature of such contouring further enables the gripping portion of the handle to be used with a conventional straight-shaft fly fishing rod, allowing for ease in retrofitting existing fly rods and continued use of present fly rod cases. The lack of a large angle allows the gripping portion of the handle to be formed from cork, resulting in a significantly stronger and lighter fly fishing rod-handle-gripping portion combination.

The contour of the gripping portion of the present invention places the upper arc of the grip under the thenar eminence and along the hypothenar eminence, filling the contours of the palm and creating a secure and comfortable grip, and making the fly rod a more integral extension of the forearm for more efficient casting. Furthermore, the contouring eliminates the repeated stress of centrifugal force in casting. This allows for a more relaxed casting grip, materially lessening fatigue while increasing power and accuracy. The increased security of the grip enables the user to maintain a stiff wrist, which is required to utilize a fly rod accurately and efficiently. The natural maintenance of a stiff wrist facilitated by the present handle further reduces stress on the wrist during the course of an extended period of fly fishing.

Referring now to FIG. 1, a preferred embodiment of the present invention is shown as comprising a gripping portion 1 of a handle 2 surroundingly mounted on an elongated shaft member 3 of a fly fishing rod 4. The fly fishing rod 4 is shown most clearly in FIG. 1. As seen in FIG. 3, the gripping portion 1 of the handle 2 is substantially oval in shape, with an axially extending opening 5 extending the length of the handle 2 into which the fly fishing rod 4 is inserted.

The handle 2 has a distal end 24 opposing a proximal end 25. As depicted in FIG. 1, the distal end 24 of the handle 2 is oriented in the direction of a casting end 26 of the fly fishing rod 4, and the proximal end 25 of the handle 2 is oriented in the direction of a user end 27 of the fly fishing rod 4.

Figure 4:
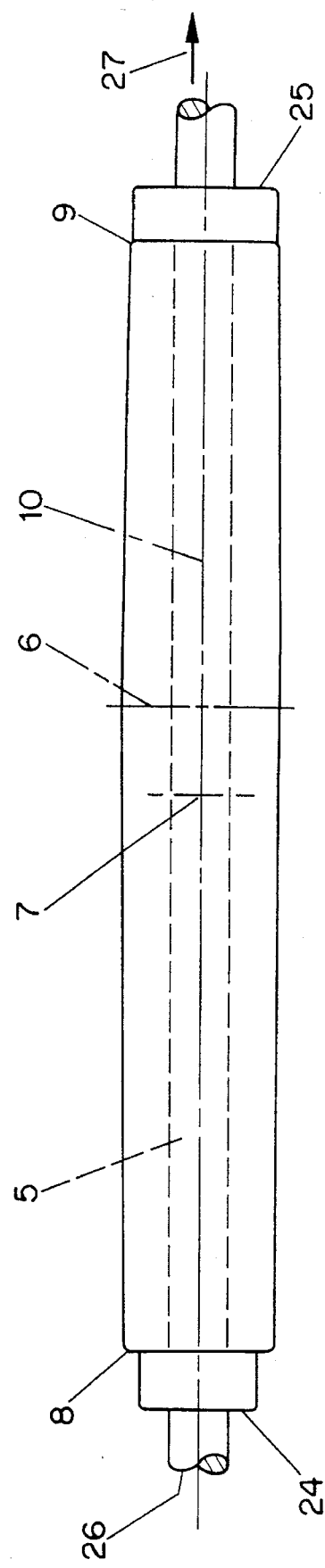
FIG. 4 is a top view of the gripping portion shown in FIG. 2

FIG. 4 depicts the symmetrical tapering of the gripping portion 1 along a short axis 6 of the oval cross-section, from a center 7 of the gripping portion 1, in both directions toward a distal gripping portion end 8 opposing a proximal gripping portion end 9. In the preferred embodiment, the short axis 6 attains a maximum measure of 0.950 inches at the center 7, and has a minimum measure of 0.825 inches at the distal and proximal ends 8, 9.

Also, as seen most clearly in FIG. 2, gripping portion 1 is tapered asymmetrically along its long axis 31, across its length 10. At its maximal point, which occurs at a center 11 of the arc of a fifth angular curvature 13 along a bottom side 14 of the gripping portion 1, the long axis 31 preferably measures 1.250 inches. In a preferred embodiment, the long axis 10 tapers from center 11 to a measure of 0.950 inches at distal gripping portion end 8 and 1.10 inches at proximal gripping portion end 9.

A top side 15 of gripping portion 1 extends between proximal gripping portion end 9 and distal gripping portion end 8. Top side 15 includes a first and second angular curvatures 16, 17. First angular curvature 16 originates at distal gripping portion end 8, and is disposed away from axially extending opening 5. The arc of first angular curvature 16 preferably has a radius of ten inches. Second angular curvature 17 extends from first angular curvature 16 and curves in the opposite direction, toward axially extending opening 5, terminating at distal gripping portion end 8. The arc of second angular curvature 17 of top side 15 has a preferred radius of twelve inches.

Bottom side 14 of gripping portion 1 opposes top side 15 and has three angular curvatures 20, 13, 21. The third and fourth angular curvatures 20, 21 are angularly disposed toward axially extending opening 5. Preferably, the arc of third angular curvature 20 has a radius of five inches, and the arc of fourth angular curvature 21 has a radius of ten inches. Fifth angular curvature 13 is disposed along bottom side 14, intermediate third and fourth angular curvatures 20, 21. Fifth angular curvature 13 is further disposed toward axially extending opening 5, creating a depression 30 between angular curvatures 20, 21, depression 30 being sufficient to accommodate the fingers of a user's hand when in the gripping position and the arc of the fifth angular curvature having a preferred radius of 9.5 inches.

Bottom side 14 is contoured such that third angular curvature 20 originates at distal gripping portion end 8. Fifth angular curvature 13 extends from third angular curvature 20. Fourth angular curvature 21 extends from fifth angular curvature 13 and terminates at proximal gripping portion end 9.

A latitude of modification, change and substitution is intended in the foregoing disclosure. For example, it would be understood by a person of ordinary skill in the art that the gripping portion and handle of the present invention can be beneficially adapted for use on any number of tools, implements and items of sports equipment due to its ability to be mounted on a straight elongated shaft. Such a person of ordinary skill in the art would also understand that the dimensions provided herein are reflective of only part of the prospective user population, and can be readily adjusted in order to accommodate differing user hand sizes. The person of ordinary skill would also understand that the gripping portion can be extended and adapted in both the proximal and distal directions. Accordingly, it is appropriate that the appended claims be construed broadly and in a manner consistent with the spirit and scope of the invention.

What is claimed is:

1. An ergonomically optimized handle for use on a fishing rod with an elongated shaft member and a reel located at a proximal end of said elongated shaft member, said handle comprising:
   a. an axially extending opening for engaging said elongated shaft member; and
   b. a contoured gripping portion for receiving a user's hand and fingers adjacent said axially extending opening having a distal gripping portion end and a proximal gripping portion end located opposite said proximal gripping portion end, said contoured gripping portion comprising:
      (i) a top side extending between said proximal and distal gripping portion ends, said top side having a first angular curvature angularly disposed away from said axially extending opening, and originating at said distal gripping portion end, coupled to a second angular curvature angularly disposed toward said axially extending opening, and terminating at said proximal gripping portion end; and
      (ii) a bottom side opposite said top side having a third angular curvature originating at said distal gripping portion end with an angular curvature angularly disposed away from said axially extending opening, a fourth angular curvature terminating at said proximal gripping portion end with an angular curvature angularly disposed away from said axially extending opening, and a fifth angular curvature intermediate said third and fourth angular curvatures with an angular curvature angularly disposed toward said axially extending opening aligned such that said fifth angular curvature extends from said third angular curvature to said fourth angular curvature, and creates a depression between said third and fourth angular curvatures dimensioned to receive the user's four non-thumb fingers.

2. The handle of claim 1 wherein said contoured gripping portion is composed of cork.

3. The handle of claim 1 wherein said contoured gripping portion has a substantially oval cross-section, said oval cross-section having a long axis extending vertically between said top and bottom sides.

4. The handle of claim 3 wherein said contoured gripping portion has a center equidistant from said proximal and distal gripping portion ends, and said substantially oval cross-section decreases in circumference as the distance decreases (i) from said center to said proximal end, and (ii) from said center to said distal end.

5. The handle of claim 3 wherein said long axis is shorter at said distal end than at said proximal end.

6. A fishing rod having:
   a. an elongated shaft member having
      (i) a casting end; and
      (ii) a user engagement end opposite said casting end;
   b. an ergonomically optimized handle mounted on said elongated shaft member at said user engagement end, said handle having a proximal handle end and a distal handle end opposite said proximal handle end, such that said proximal handle end is co-directional with said casting end, and said distal handle end is co-directional with said user end, and having a contoured gripping portion;
   c. a reel located between said proximal handle end and the user end of said elongated shaft member; and
   d. said contoured gripping portion comprising:
      (i) a proximal gripping portion end extending in the direction of the proximal handle end;
      (ii) a distal gripping portion end opposite said proximal gripping portion end extending in the direction of said distal handle end;
      (iii) a top side extending between said proximal and said distal gripping portion ends, said top side having a first angular curvature angularly disposed away from said elongated shaft member originating at said distal gripping portion end, coupled to a second angular curvature angularly disposed toward said elongated shaft member terminating at said proximal gripping portion end; and
      (iv) a bottom side opposite said top side having a third angular curvature originating at said distal gripping portion end and a fourth angular curvature terminating at said proximal gripping portion end, said third and fourth angular curvatures angularly disposed away from said elongated shaft member, and a fifth angular curvature angularly disposed toward said elongated shaft member intermediate said third and fourth angular curvatures such that said fifth angular curvature extends from said third angular curvature, and said fourth angular curvature extends from said fifth angular curvature, and said fifth angular curvature creates a depression between said third and fourth angular curvatures dimensioned to receive the user's four non-thumb fingers.

7. The fishing rod of claim 6 wherein said gripping portion is composed of cork.

8. The fishing rod of claim 6 wherein said contoured gripping portion has a center equidistant from said proximal and distal gripping portion ends, and said substantially oval cross-section decreases in circumference as the distance from said center to said proximal gripping portion end decreases and as the distance from said center to said distal gripping portion end decreases.

9. The fishing rod of claim 6 wherein said long axis is shorter at said distal gripping portion end than at said proximal gripping portion end.

* * * * *